March 26, 1957 J. G. UNTERFRANZ 2,786,500
COMBINATION CARRYING CASE AND TABLE FOR PORTABLE POWER TOOL
Filed March 26, 1954 4 Sheets-Sheet 1
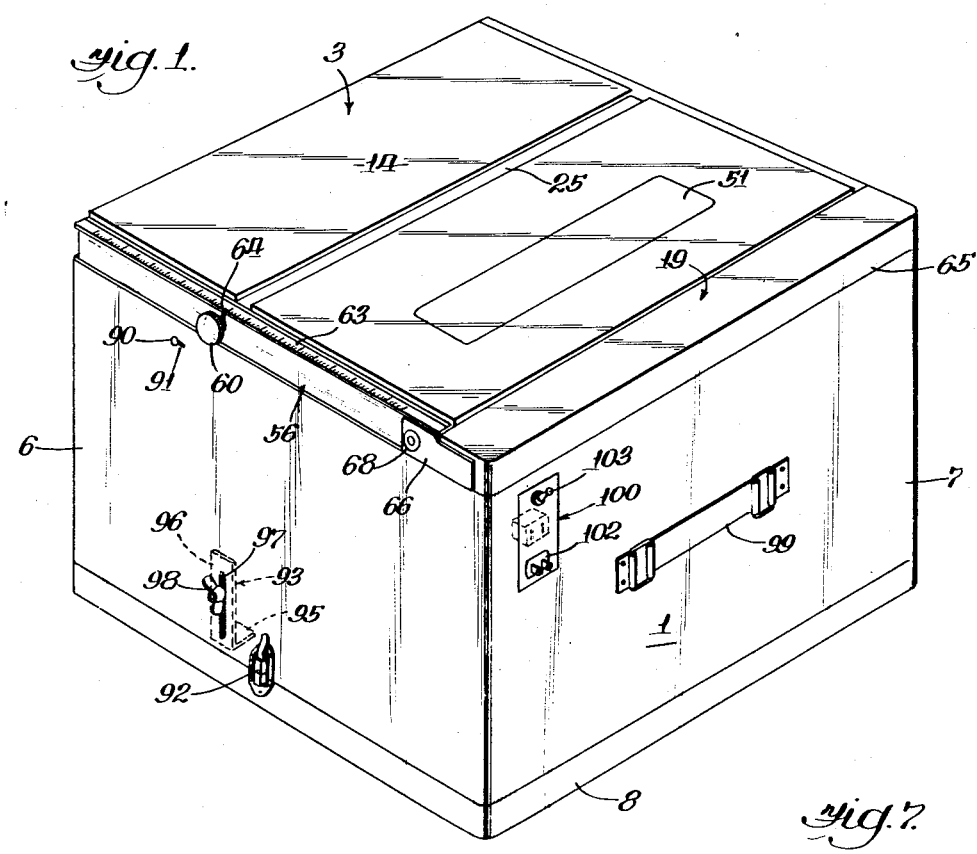
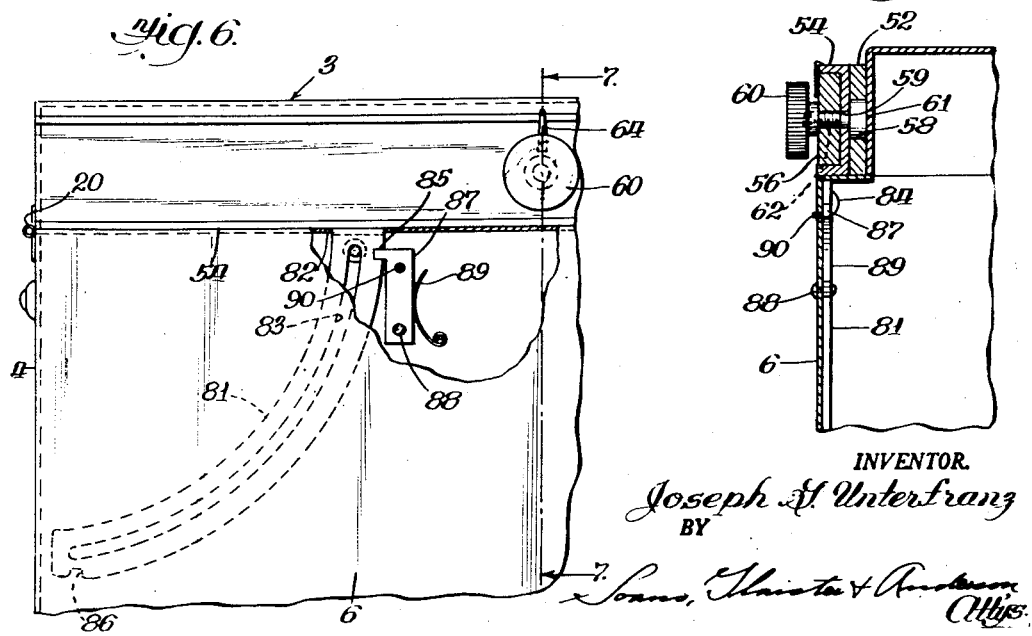
INVENTOR.
Joseph G. Unterfranz March 26, 1957 J. G. UNTERFRANZ 2,786,500
COMBINATION CARRYING CASE AND TABLE FOR PORTABLE POWER TOOL
Filed March 26, 1954 4 Sheets-Sheet 3

INVENTOR.
Joseph G. Unterfranz
BY
Evans, Haister & Anderson
Attys.

March 26, 1957  J. G. UNTERFRANZ  2,786,500
COMBINATION CARRYING CASE AND TABLE FOR PORTABLE POWER TOOL
Filed March 26, 1954  4 Sheets-Sheet 4
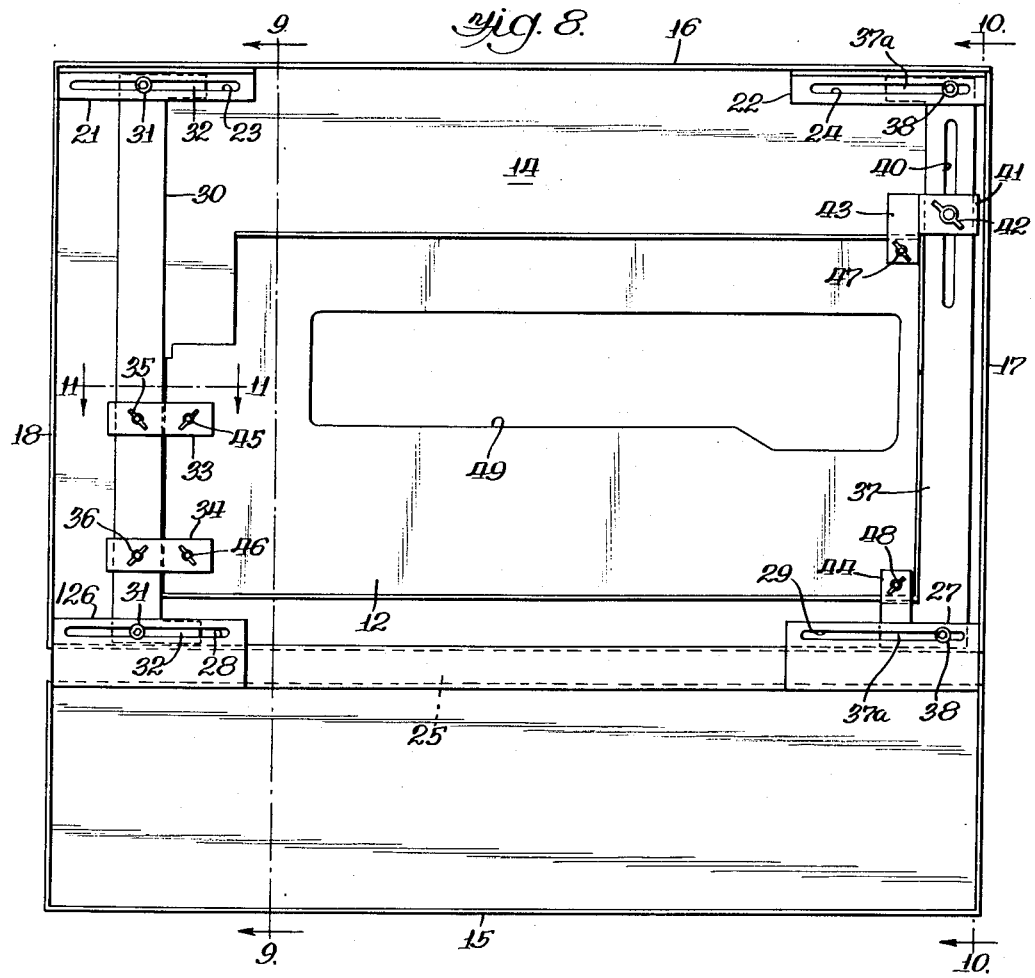
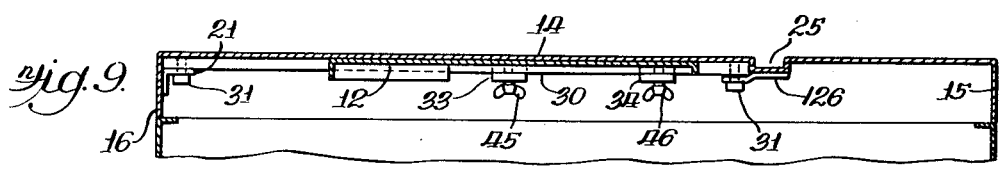
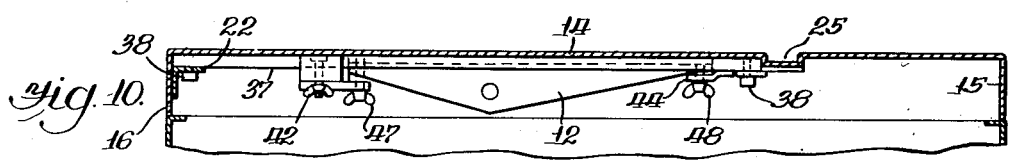
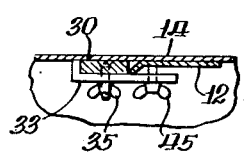
INVENTOR.
Joseph G. Unterfranz
BY
Sonns, Meister & Anderson
Attys.

United States Patent Office 2,786,500
Patented Mar. 26, 1957

2,786,500

COMBINATION CARRYING CASE AND TABLE FOR PORTABLE POWER TOOL

Joseph G. Unterfranz, Chicago, Ill.

Application March 26, 1954, Serial No. 418,935

2 Claims. (Cl. 144—285)

The present invention relates generally to portable cases for machines and is particularly directed to an improved form of carrying case for a portable, electrically-driven power tool.

In recent years, there has been a marked development in the field of portable power tools and their use has gained widespread acceptance. Both the professional carpenter and the amateur handyman have found a multitude of uses for the type of power-saws, grinders, sanders, etc. which can be plugged into an electrical outlet and carried about for use as needed. Such tools have considerably influenced the methods used in building homes and have made it possible to do many on-the-site operations at a much faster rate than was previously possible with hand-operated tools. Various types of cases, of course, have been provided for carrying these portable power tools, and various types of stands and benches have been provided for stationary use of the power tools when such is desired.

The principal object of the present invention is to provide an improved form of carrying case for a portable, power-driven tool, which also provides a stand and work table for stationary use of the tool. Other objects of the invention are to provide a carrying case of the type described which provides an extensible work table; to provide a convertible carrying case having adjustable means for supporting various sizes of tools in operating position in the case; to provide a carrying case including means for securing same in fixed relation to a supporting surface; to provide a case of this type which is particularly adaptable for use with circular saws with various sizes of skid bases, and which includes adjustable guide means for determining the disposition of the cut to be taken in the work piece. Other objects and advantages will become apparent as the disclosure progresses with respect to the accompanying drawings, wherein:

Figure 1 is a perspective view of a carrying case selected to illustrate the present invention.

Figure 6 is an enlarged side view of a corner portion of the carrying case with parts broken away.

Figure 7 is a sectional view taken along the line 7—7 in Figure 6.

Figure 8 is a bottom plan view of the hinged top of the carrying case with the extensible portion of the top and the power tool omitted.

Figure 9 is a sectional view taken along the line 9—9 in Figure 8.

Figure 10 is a sectional view taken along the line 10—10 in Figure 8.

Figure 11 is a sectional view taken along the line 11—11 in Figure 8.

Figure 2:
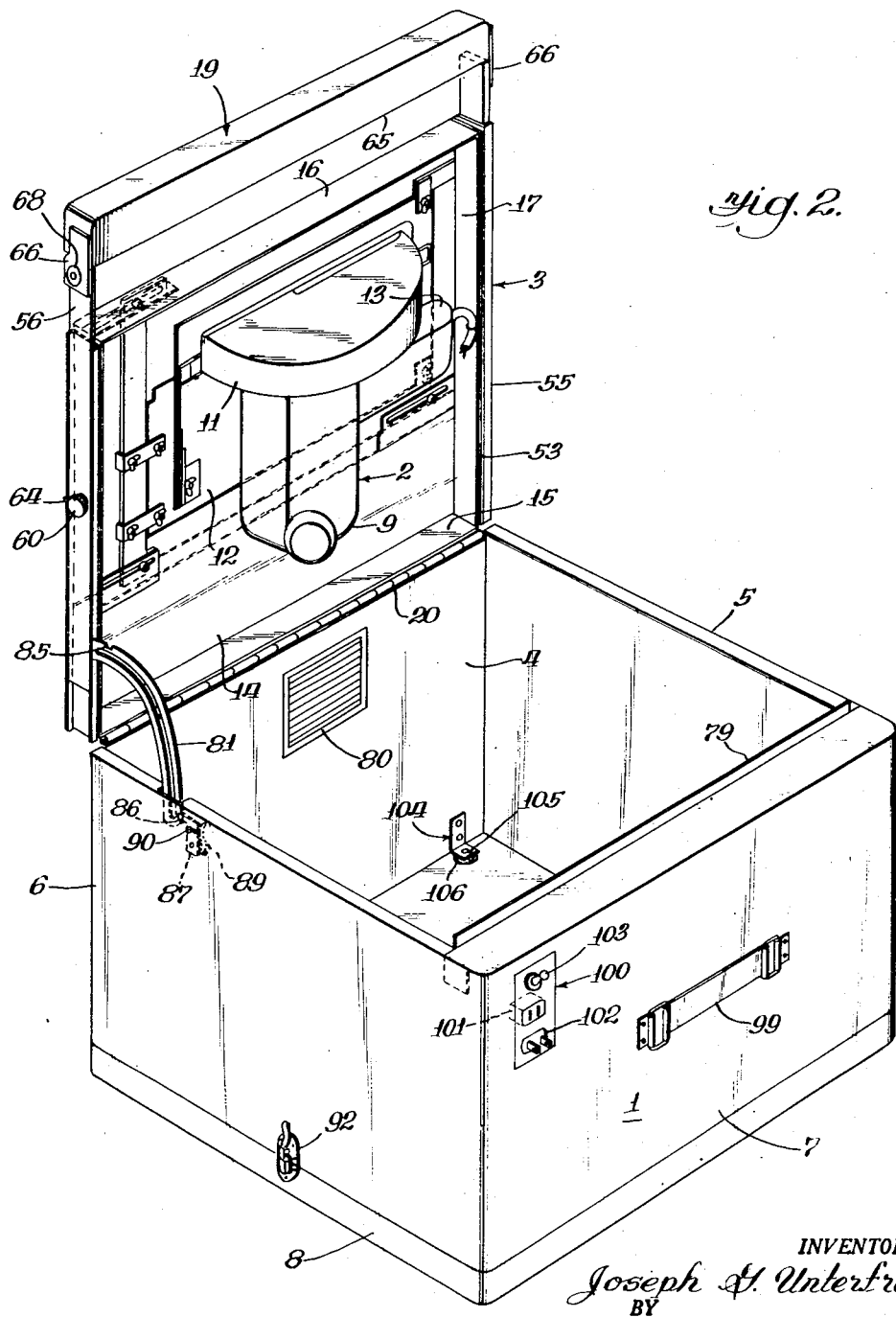
Figure 2 is a perspective view of the carrying case with the top open.
Figure 3:
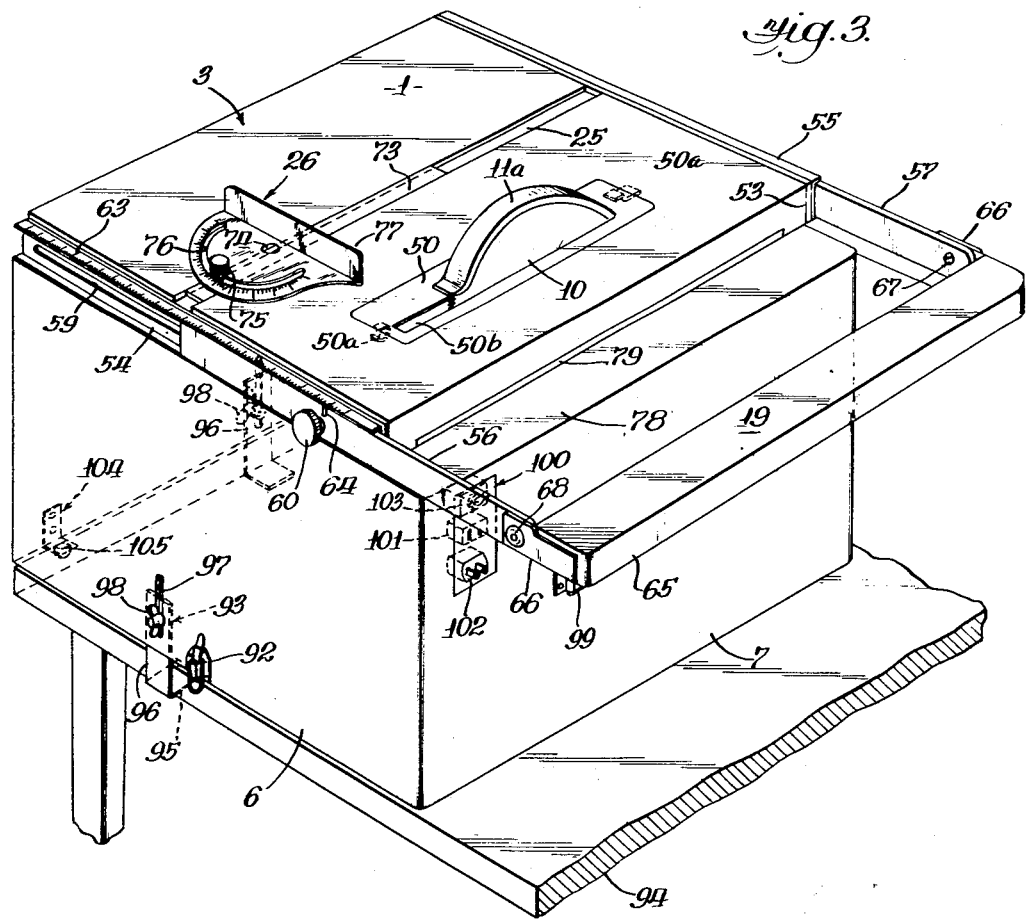
Figure 3 is a perspective view of the carrying case with the tool and case in their operative positions.

With reference particularly to Figures 1–3 of the drawings, it is seen that the selected embodiment of the present invention is a convertible carrying case 1 for an electrically-operated, circular hand saw 2, wherein the case 1 is adapted to completely house the saw 2 or to support the saw in a working position, as desired.

In the illustrated embodiment, the carrying case 1 comprises a rectangular box, which is preferably metal but which may be made of wood or any other suitable material or combination thereof, having a hinged top 3, a rear wall 4, a pair of side walls 5 and 6, a forward wall 7, and a removable bottom 8. The box is of sufficient size to completely house the electric hand saw 2 when in its inoperative condition and, also, to provide adequate working surface for the saw on one surface of the case when the saw is disposed for operation.

The electric saw 2 is of a well-known type having a motor 9 (Figure 2), a circular saw blade or disk 10, and a guard 11 for the saw disk which includes a detachable, pivoted upper part 11a. The saw also includes the usual skid base 12 and a handle portion or grip 13 for holding the saw when it is desired to remove it from the case and use it as a hand saw.

The skid base 12 is attached to the saw in the usual manner so as to afford movement of the skid base relative to the saw disk 10 in order to adjust the depth and angle of cut, and the upper portion 11a of the guard is movably mounted and spring biased in position to permit the guard portion to move relative to the skid base 12. As will be seen later, the skid base 12 provides means for mounting the saw in the convertible case 1.

Referring particularly to Figure 2, it is seen that the top 3 of the convertible carrying case comprises a main portion which is in the form of a shallow, box-like structure having a top wall 14 with four side edge portions 15, 16, 17, and 18 extending downwardly therefrom in the direction of the bottom portion of the case, and an extensible section 19 disposed at one end of the main top portion 14. One end of the top portion 14 is hingedly connected along the edge 15 to the upper edge of the rearward wall 4, as by a piano-type hinge 20.

As seen in Figure 8, the inside of the shallow top portion 14 includes adjustable supporting means for the saw skid base 12, whereby skid bases of various sizes may be detachably clamped in position on the under side of the top 3 of the carrying case. This supporting means includes a pair of angle brackets 21 and 22, each of which has a flange portion suitably secured, as by welding, to the inner side of the top edge portion 16 at opposite ends of the latter. The other flange portions of the brackets 21 and 22 are disposed in parallel, spaced relation to the top wall 14, and these flanges include a pair of elongated slots 23 and 24, respectively.

Intermediate the length of the top edge portions 15 and 16, and parallel thereto, is a transversely disposed channel 25 which is formed in the top wall 14 and extends the width of the carrying case 1. This channel 25 serves to slidably receive a miter gauge 26 (Figure 3) for determining the horizontal angle of cut to be made by the saw 2. The channel 25 forms a rib on the under side of the top wall 14 to which is welded, or otherwise fastened, a second pair of brackets 126 and 27. These brackets extend inwardly of the top edge portions 17 and 18 and include a pair of elongated slots 28 and 29, respectively, which are parallel to the slots 23 and 24 in the first-mentioned brackets 21 and 22.

The brackets 21 and 126 support an elongated guide bar 30 for the saw skid base 12, which bar includes suitable threaded openings (not shown) at opposite ends thereof in position for receiving a pair of screws 31 which extend through the slots 23 and 28. In this manner, the bar 30 is adjustably positionable to accommodate various lengths of skid bases. Preferably each of the ends of the bar 30 include a widened section 32 to thereby provide additional supporting strength for the bar. Intermediate the ends of the bar 30 are a pair of transversely extending, spaced-apart brackets 33 and 34 which are detachably secured to the bar by the wing nut screws 35 and 36, respectively.

Another guide bar 37 is similarly disposed between the other pair of brackets 22 and 27 disposed at the opposite side of the top wall 14 of the carrying case. This guide bar 37 also includes suitable openings at opposite ends thereof for receiving a pair of screws 38 which detachably secure the bar to its supporting brackets. Adjacent one end of the bar 37 there is provided an elongated slot 40 for adjustably securing a transverse strap member 41 to the bar as by a screw and wing nut 42. One end of the strap 41 has a transversely disposed support bracket 43 suitably fixed thereto in generally parallel relation to the guide bar 37. The free end of the bracket 43 is adapted to support an adjoining section of the saw skid base, as will be later described. The opposite ends of the guide bar 37 also include widened transverse portions 37a, similar to the portions 32 of the guide bar 30, and a short bracket member 44 is secured in position on the portion 37a adjacent the bar supporting bracket 27 for further supporting the saw 2.

It is seen from the foregoing that the brackets 33, 34, 43, and 44 provide a support for the saw skid base 12, with the latter being fixed in position by the wing nut screws 45, 46, 47, and 48, respectively. The saw may be readily placed in position on the top wall 14 of the carrying case 1 by moving one or both of the guide bars 30 and 37, through the adjustment afforded by the slots 23, 24, 28, and 29, to a position permitting engagement of the skid base 12 with the top wall 14, and then moving the guide bars into abutting engagement with opposite side edges of the skid base. The brackets 33, 34, 43, and 44 are then in position overlying the skid base and the wing nuts on each of the brackets are tightened to secure the skid base in position.

The above disposition of the skid base is, of course, such that the circular blade 10 extends through the opening 49 (Figure 8) afforded in the top wall 14 of the case. This opening is considerably wider than the blade 10, primarily to provide for angular disposition of the blade relative to a vertical plane when other than a straight vertical cut is desired. For the normal straight cutting operations there is provided an insert 50 (Figure 3) which fits into the top of the opening 49 in the carrying case and is held in position by a pair of clips 50a extending from opposite sides of the insert. The insert 50 includes an elongated slot 50b for receiving the circular saw blade 10 and the guard 11a for normal cutting. When it is desired to tilt the saw blade for angular cutting, the insert 50 is removed.

When it is desired to carry the saw in a concealed position within the case, the saw is adjusted in the usual manner relative to its skid base 12 to place the saw blade 10 below the top of the carrying case 1, and the guard portion 11a is moved out of the way to a position below the upper surface of the case. The slotted insert 50 is removed and a blank insert 51 is placed in covering relation to the opening 49, as seen in Figure 1.

As seen particularly in Figures 1, 2 and 3, the top 3 of the carrying case also includes the extensible section 19, forming a rip fence and the miter gauge 26, both of which are adjustably positionable on the above-described top portion 14. The rip fence 19 forms a portion of the carrying case top 3 and is positionable either in edge-abutting, flush relation to the main top portion 14 (Figure 1) or in extended, spaced relation thereto (Figure 3).

The supporting structure for the rip fence 19 includes a pair of elongated spacer bars 52 and 53 (Figures 3 and 7) which are welded or otherwise secured to the top edge portions 17 and 18, respectively, a pair of channel members 54 and 55, and a pair of elongated slides 56 and 57. Each of the spacer bars has a longitudinally extending slot 58 therein, and each of the channel members 54 and 55 has a corresponding slot 59 aligned with the slot in the spacer bars but narrower in width. The slides 56 and 57 are disposed between the flanges of their respective channel members, and each of the slides is held in position by a screw and a knurled knob 60. As seen in Figure 7, the screw has its head portion 61 disposed in the spacer bar slot 58 and its threaded portion 62 extends through a suitable opening in the slide 56. The portion 61 of the screw which passes through the slot 59 in the channel member 54 is, of course, free to slide in the slot. The outer end of this screw extends beyond the slide 56 and receives the knurled knob 60. Consequently, the slides 56 and 57 are movable along the edge of the top of the carrying case and can be selectively fixed in position by tightening the knobs 60.

In order to accurately measure the disposition of the rip fence 19 with respect to the saw blade 10, the upper flange of the channel members 54—55 includes a scale 63 (Figure 3), and the slide bars 56—57 have a pointer 64 fixed thereon for indicating the width of cut as measured by the scale. The scale 63 is suitably divided in inches and parts thereof, so that when the pointer 64 coincides with zero on the scale the rip fence 19 is bearing against the saw blade 10.

Figures 4, 5:
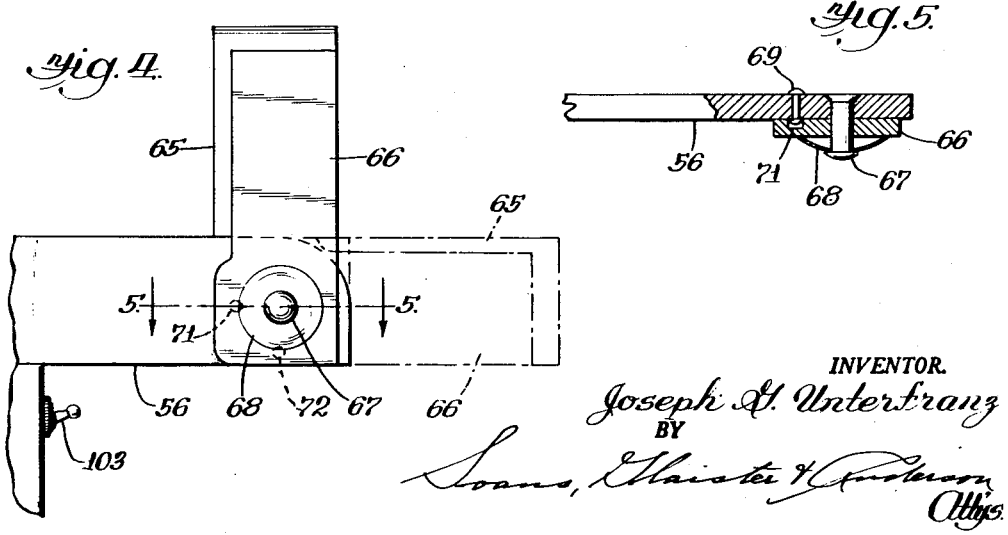
Figure 4 is an enlarged side view of a portion of the structure seen in Figure 3 with the alternate limit position for a section of the top of the case being indicated by broken lines.
Figure 5 is a sectional view taken along the line 5—5 in Figure 4.

As seen best in Figure 4, the rip fence 19 includes an elongated member 65 which is disposed between the ends of the slides 56 and 57 and is secured thereto for rotation about a transverse axis. A pair of arms 66 are secured to the opposite ends of the member 65, and each of these arms presents a free end portion which is pivotally connected with the adjacent end of the associated slide by suitable means, such as the rivet 67 and spring washer 68. Consequently, the rip fence member 65 is rotatable about the axis of the rivets 67. For selectively securing the member 65 in either a horizontal or a vertical position there is provided suitable mechanism, such as the pin 69 on each of the slides 56 and 57, and a pair of cooperating recesses 71 and 72 in the arm 66. The spring washer 68 serves to hold the arm 66 against the supporting slide member with the pin 69 engaging a selected one of the recesses 71 and 72.

The miter guide 26, which is provided for use with the table-forming carrying case, includes a slide 73 which is adapted to fit in the channel 25 in the upper surface of the top wall 14 in readily removable relation thereto. The miter guide is pivotally mounted on the slide 73, as by a rivet 74, and an adjusting screw 75 is disposed through the arcuate slot 76 in the guide for threaded engagement with a suitable bore in the slide 73. The guide includes angular measurements around the arcuate slot 76 for coincidence with a mark on the slide 73 to thereby indicate the angular disposition of the vertically extending flange portion 77 of the miter guide.

The walls 4, 5, 6, and 7 of the carrying case are, of course, of sufficient depth to accommodate the hand saw 2, and preferably the upper edges of these walls include an inwardly turned lip so that adequate bearing area is provided for the top 3. In this latter respect, the forward wall 7 has an inwardly turned upper edge 78 having a width corresponding to the width of the rip fence member 65 and terminating in a vertical flange 79. One of the walls is also preferably provided with a louvered opening 80 to provide for circulation of air within the case. In this latter respect, there is also preferably provided a foot 104 (Figures 2 and 3) adjacent each of the four inside corners of the case, including a rubber button 105 or the like which is disposed to rest within a concave recess 106 in the upper surface of the bottom member 8. With the carrying case in the operative position shown in Figure 3, the feet 104 serve to elevate the case slightly above the table 94 to provide for circulation of air between the table and the case. Additionally, there is provided suitable support means along one or more of the inner walls for fixedly retaining the miter guide 26 and the inserts 50 and 51 for the saw blade opening 49, when these parts are not in use.

As previously indicated, the top 3 is connected to the upper edge of the rear wall 4 by the hinge 20. The relative movement of the top 3 is controlled by a latch mechanism including an arcuate guide member 81 (Figure 6) having a flange portion 82 at one end which is suitably secured, as by welding, to the lower flange of the channel member 54 disposed along the top edge portion 18 of the carrying case. The guide 81 extends downwardly along the inside of the wall 6 and has an arcuate slot 83 formed therein which is slidably engaged by a pin or rivet 84 fixed in the adjacent portion of the side wall 6.

The upper and lower end portions of the guide 81 include a pair of notches 85 and 86, respectively, in position for engagement with a latch 87 carried by the side wall 6 of the carrying case 1. The latch 87 is pivotally mounted on the case, as by the rivet 88 disposed through the lower end of the latch, and is biased for movement in the direction of the guide 81 by a spring 89. The upper end of the latch has a laterally projecting pin 90 fixed thereto, which extends through a slotted opening 91 (Figure 1) in the side wall 6 of the carrying case.

Consequently, the latch 87 is movable against the pressure of the spring 89 from the outside of the carrying case, and the latch is engageable with either of the notches 85 or 86 to lock the top in its closed or open position as desired. This feature of construction is particularly advantageous in that it provides means for maintaining the top in the raised position seen in Figure 2, so that the saw may be installed in the case or adjusted therein without any danger of the top falling. Furthermore, the guide and latch mechanism provides a lock for the top 3 in its closed position, and thereby eliminates the necessity of interfering with the rip fence member 65 or the slides 56 and 57 by placing a latch along one of the side edges of the carrying case.

The bottom portion 8 of the carrying case 1 is removably held in position by a pair of suitable snap latches 92 disposed on opposite sides of the case. In addition, the convertible case 1 is provided with one or more retractable clamps 93 (Figure 3) for clamping the bottomless case in position on a work bench 94 or the like, in order to provide additional rigidity to the saw table formed by the carrying case. The clamp 93 comprises a strap member having an end portion 95 bent at right angles with respect to the elongated main part 96 of the clamp. The projecting foot portion 95 thus formed is adapted to engage the under side of a supporting surface, such as the work bench 94, to clamp the case 1 in position. The clamp is disposed on the inside surface of one wall of the convertible case 1 and is adjustably secured thereto by means of a bolt, which extends through a slotted opening 97 in the side wall of the case, and a wing nut 98. When not in use, the clamp 93 is moved upwardly in the case to afford room for the bottom 8.

The most convenient manner of carrying the case 1 is with the top 3 disposed in a vertical position and, therefore, a handle 99 (Figure 1) is provided on the side wall 7. A suitable foot arrangement 104 (Figs. 2 and 3) comprising an angle bracket 105 including rubber buttons 106 or the like, may be provided at the four corners of the opposite wall 4 and 7. The wall 7 also includes a combination switch and outlet arrangement 100, comprising a receptacle 101 for receiving the plug of the wire for the saw 2, a male plug 102, and a switch 103 for controlling the receptacle 101 and the plug 102. In this way the usual switch (not shown) provided on the portable hand saw 2 may be suitably clamped in an "ON" position when in the convertible case 1, and the saw motor can then be controlled by the switch 103 on the outside of the case. The male plug 102 provides means for establishing a connection with a wall outlet or similar source of electrical power.

It is seen from the foregoing, therefore, that there is presented herein a novel combination of elements comprising a carrying case for a power tool, such as a hand saw, which is readily convertible into a work table for the tool. Furthermore, certain of the disclosed features of construction make the convertible carrying case adaptable to various types and sizes of tools, so that the case is not restricted to use with any single tool and may, therefore, be sold as a separate unit.

Although shown and described with respect to a particular embodiment, it will be apparent to those skilled in the art that certain of the principles of the present invention may well be applied to other structures and other uses.

I claim:

1. In a combination carrying case and table for a portable power tool having a rotatable element, a rectangular box having a rigid frame comprising four side walls, a top wall movably positioned in covering relation to the top of said box, a bottom wall movably positioned in covering relation to the bottom of said box, and adjustably positionable means carried by said top wall along its inner surface for supporting a tool in underlying relation thereto, said support means comprising a plurality of laterally movable brackets adapted for selective positioning in various spaced-apart positions to thereby receive tools of various sizes, and said top wall including means defining an opening therethrough for receiving the rotatable tool element projecting outwardly from said box, whereby the outer surface of said top wall provides a work surface for the tool which has its main portion disposed within said box.

2. In a combination carrying case and table for a portable power tool having a rotatable element, a rectangular box having a rigid frame comprising four side walls, a top wall having one end thereof hingedly connected to one of said side walls, a bottom wall removably positionable in covering relation to the bottom of said box, means carried by said top wall along its inner surface for supporting a power tool, said support means comprising a pair of guide bars adjustably secured to said top wall in parallel relation to a pair of opposite side edges of said top wall for movement relative to each other, and a plurality of brackets carried by said guide bars and disposed to support a tool in fixed position between said guide bars, and said top wall including means defining an opening therethrough in position for receiving the rotatable tool element projecting outwardly from said box when the tool is fixed in position on the inner surface of said top wall by said support means, whereby the outer surface of said top wall provides a work surface for the tool which has its main portion disposed within said box.

References Cited in the file of this patent

UNITED STATES PATENTS

| | | |
|---|---|---|
| 260,503 | Schermerhorn | July 4, 1882 |
| 939,125 | Fealy | Nov. 2, 1909 |
| 1,336,799 | Vaughan | Apr. 13, 1920 |
| 1,380,946 | Carter | June 7, 1921 |
| 1,521,134 | Suarez | Dec. 30, 1924 |
| 1,896,924 | Ulrich | Feb. 7, 1933 |
| 1,938,548 | Tautz | Dec. 5, 1933 |
| 2,163,320 | Hammond | June 20, 1939 |
| 2,652,863 | Grabinski | Sept. 22, 1953 |
| 2,653,634 | Mott | Sept. 29, 1953 |
| 2,697,460 | Barnett | Dec. 21, 1954 |